Sept. 4, 1928.

P. G. JOHNSON ET AL 1,683,076

SPIGOT AND SOCKET PIPE JOINT

Filed May 31, 1924   2 Sheets-Sheet 1

Inventors
Percy Graham Johnson, and
Harold Raymond Morgan
By B. Singer, Atty.

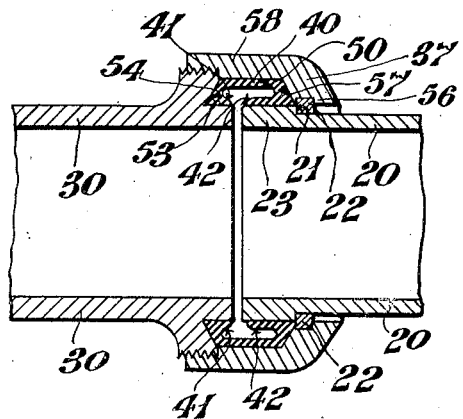
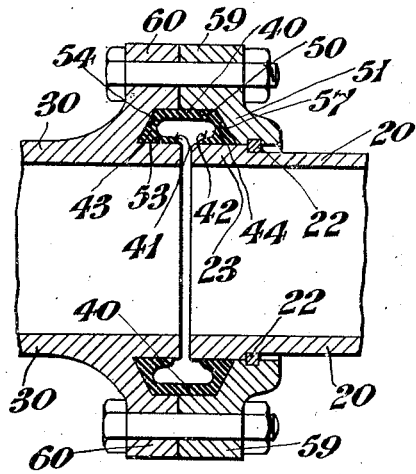
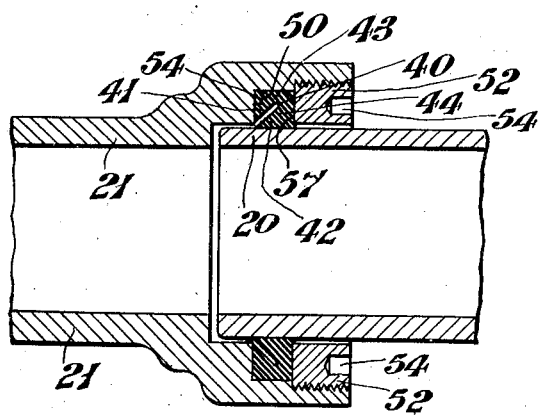
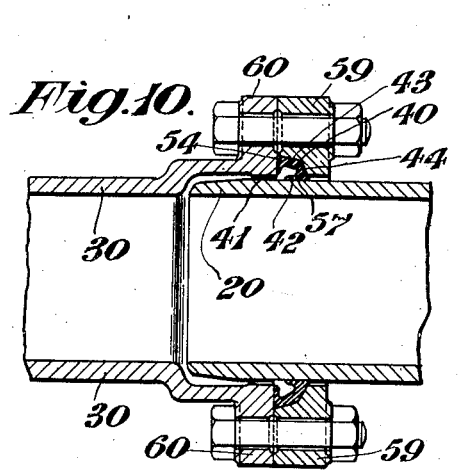
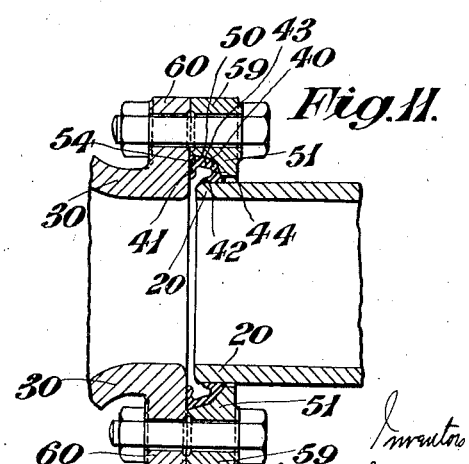

Patented Sept. 4, 1928.

1,683,076

UNITED STATES PATENT OFFICE.

PERCY GRAHAM JOHNSON AND HAROLD RAYMOND MORGAN, OF LONDON, ENGLAND, ASSIGNORS TO VICTAULIC COMPANY, LIMITED, OF LONDON, ENGLAND.

SPIGOT AND SOCKET PIPE JOINT.

Application filed May 31, 1924, Serial No. 717,035, and in Great Britain January 22, 1924.

This invention relates to spigot and socket joints, the spigot being on the end of a pipe and the socket on the end of an adjacent pipe or on a valve or other flanged or surfaced member.

In the present invention the spigot and socket joint is provided with a packing ring of the kind consisting of a hollow or annularly recessed ring of flexible material supported in a housing or recess and provided with a circumferential opening arranged to form an inlet to the fluid under pressure passing through a spigot and socket so that the free edges of the ring formed by the circumferential opening will be sealed against their bearing surfaces by fluid pressure.

According to the present invention one of the free edges of the packing ring engages the spigot while the other engages a surface within and at the inner end of the packing receiving recess in the socket member. This surface may be an annular projection of larger diameter than the spigot and formed in the socket member or projecting from a flange or surface in the socket member. The socket of the socket member may be integral therewith or detachably connected thereto by screws or bolts or by screwing therein or thereon.

Various examples of carrying out the invention are illustrated by the accompanying drawings, each of which is a sectional view of the joint.

Figure 7 is a modification of Figure 6 wherein the socket is screwed onto the socket member of the joint.

Figure 8 is a modification of Figure 6 wherein the socket is bolted onto the socket member of the joint.

Figure 9 is a modification of Figure 4 wherein the hollow packing is of rectangular cross section.

Figure 10 is a modification of Figure 8 wherein the free edges of the hollow packing ring are at an angle to one another.

Figure 11 is a modification of Figure 10 wherein the socket is connected directly to the flange of a valve.

Figure 1:
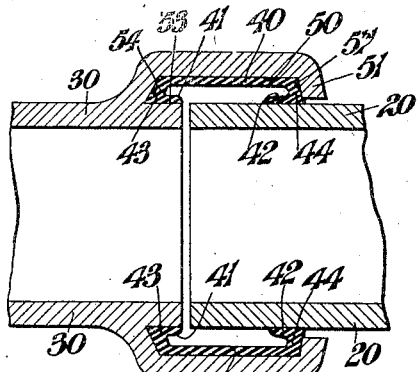
Figure 1 is a sectional view of a simple form of the joint applied to spigot and socket pipes.

In each of these figures the corresponding elements have the same reference numerals. The spigot being indicated by 20, the socket member by 30, the hollow fluid sealed packing ring of flexible material by 40 having free-edges 41 and 42 forming between them a circumferential opening to the fluid passing through the joint, the packing receiving recess being indicated by 50.

In the example shown by Figure 1 as applied to a spigot and socket pipe joint, 20 is the spigot member and 30 the socket member, the outer end of the socket member being formed as an integral inwardly extending packing ring retaining member 51. The inner end of the packing receiving recess 50 is formed as an annular groove of which the outer wall, which is a continuation of 50, is concentric with an inner wall 53 of smaller diameter.

The free edge 41 of the hollow packing ring 40 bears on the inner wall 53 of the annular groove, while the side 43 of packing ring 40 adjacent its free edge 41 bears on the bottom 54 of the annular groove. The other free edge 42 of the packing ring bears directly on the spigot 20 while the side 44 of the packing ring bears against the inner side 57 of the inwardly extending member 51.

The spigot 20 is inserted a sufficient distance through the free edge 42 of the packing ring into the socket member 30 to leave sufficient space between the abutting portions of the spigot and socket for fluid to pass into the packing ring and press the free edges 41 and 42 thereof against their bearing surfaces to form a fluid tight joint.

Figure 2:
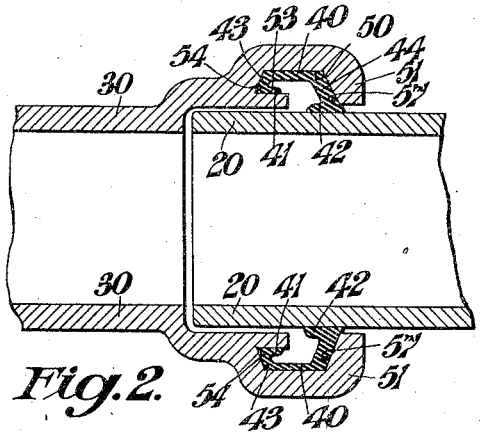
Figure 2 is a modification of Figure 1 in which the packing ring has sealing edges of different diameters.

In the modification of Figure 1 shown by Figure 2, the spigot extends beyond the packing ring 40 into the socket, and to enable this to be effected the free edge 41 of the packing ring 40 is of larger diameter than the free edge 42 which engages the spigot 20 directly, the diameter of the inner wall 53 of the annular groove being correspondingly increased. The other details of Figure 2 are exactly the same as in Figure 1.

Figure 3:
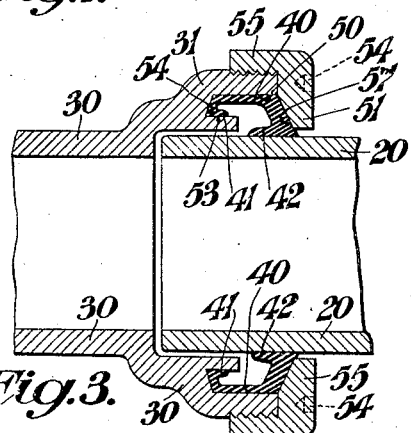
Figure 3 is a modification of Figure 2, in which the outer end of the socket is closed by a packing retaining member screwed on to the main portion of the socket.

In the modification of the joint shown in Figure 2 as illustrated by Figure 3, the inwardly extending packing ring retaining member 51 is detachable, being formed integral with a sleeve 55 screwed on to the outer portion 31 of the socket member 30. Holes 54 are formed in the outer surface of the member 51 to facilitate its removal by a suitable implement.

Figure 4:
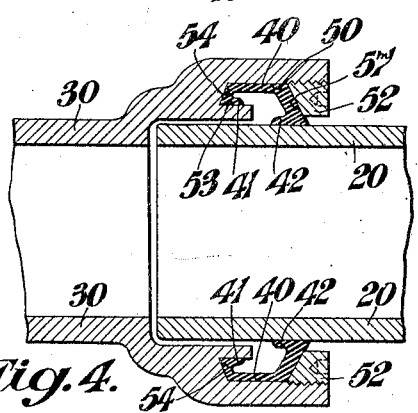
Figure 4 is a modification of Figure 3 in which the packing retaining member screws into the socket.

In the modification of the joint shown in Figure 3 as illustrated by Figure 4 the inwardly extending packing ring retaining member is formed as a screwed gland 52 screwing into an opening continued as the packing receiving recess 50.

Figure 5:
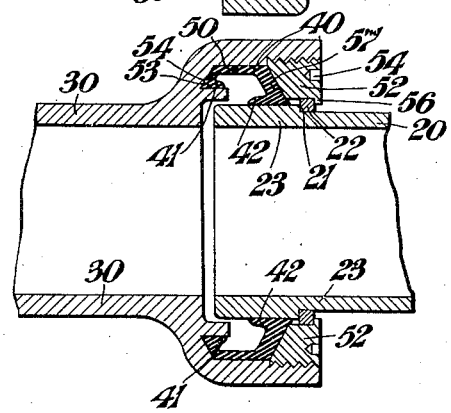
Figure 5 is a modification of Figure 4 wherein is provided a split ring for preventing separation of the pipes.

Figure 5 illustrates a modification of Figure 4 wherein the gland 52 is provided on its inner diameter or bore with a shoulder 56 adapted to hold a split ring 22 against a shoulder 21 formed by an enlargement 23 on the end of the spigot adapted to receive the free edge 42 of the packing ring. The split ring 22 thereby preventing the longitudinal separation of the spigot 20 and the socket member 30.

Figure 6:
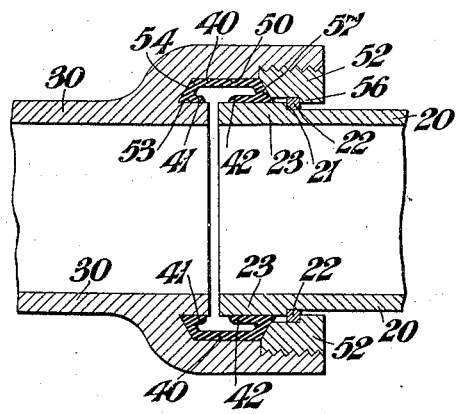
Figure 6 is a modification of Figure 5 the packing ring having sealing edges of the same diameter.

Figure 6 is a modification of Figure 5 wherein the free edges 41 and 42 of the packing ring and their bearing surfaces 53 and on 23 are of the same diameter.

Figure 7 is a modification of Figure 6 wherein the packing ring recess 50 is formed in a socket 58 screwed on to the socket member 30, the inwardly extending packing ring retaining member 51 engaging both the end 44 of the packing ring and the split ring 22, and is formed integral with the socket 58 instead of being a screwed gland 52 as in Figure 6.

In the modification shown in Figure 8, the packing ring recess 50 is formed in a socket 59 bolted on to a flange 60 of the socket member 30, the inwardly extending packing ring retaining member 51 engaging both the end 44 of the packing ring and the split ring 22, and is formed integral with the socket 59.

In the modification of the joint shown in Figure 9 the hollow or recessed packing ring 40 is of rectangular cross section and is held in the packing ring recess 50 by a screwed gland 52 as in Figure 4. In this example the free edge 42 of the packing ring as in each of the other examples, bears on the spigot 20 while the free edge 41 is at an angle to the edge 42 and bears on the end surface 54 of the recess 50, so that the free edge 41 and the side 43 of the packing ring become continuous, that is merged into one another, while the side 44 bears on the inner surface of the screw gland 52 as in Figure 4. The free edges 41 and 42 in this example extend towards the inner corner of the rectangular section of the packing ring and the circumferential opening therein is arranged diagonally, thus providing a packing ring of simple construction adapted to bear on faces which could be readily machined if required.

In Figure 10 the packing ring 40 is held in place by a socket 59 bolted on to a flange 60 of the socket member 30 as in Figure 8, the free edge 42 of the packing ring 40 bearing on the spigot 20 and the side 44 bearing against the surface 57 of the inwardly extending member 51 also as in Figure 8, while the free edge 41 of the packing ring has its bearing face 54 directly on the face of the flange 60. In this example the side 43 of the ring bears directly on the surface of the packing recess 50, such recess in this example being conical instead of cylindrical as in each of the other examples.

Figure 11 is a slight modification of Figure 10 showing the application of the invention to the joint of a pipe with a valve. The socket member 30 is formed directly on the valve inlet or outlet which is provided with a flange 60 as in Figure 10. The other details are exactly as in Figure 10. This modification is applicable for connecting a spigot pipe to any device having a faced or flanged opening similar to that of the flange 60.

In the above examples the free edges 41 and 42 of the hollow packing ring 40 are preferably moulded with slightly inclined or conical bearing surfaces so arranged that the extreme free edges of these will first engage their bearing surfaces when pressed thereon and so prevent any fluid passing under them while they are being subjected to the pressure of such fluid.

The sides 43 and 44 of the packing ring 40 in each of the above examples are inclined towards each other from their free edges 41 and 42, this also assists in rendering the joint self sealing by fluid pressure.

What we claim and desire to secure by Letters Patent is:—

1. A spigot and socket joint comprising, a spigot, a socket member having a packing ring receiving recess of which the outer end is closed by an externally screwed packing gland screwing into the outer end of the packing receiving recess, a hollow fluid-sealed packing ring of flexible material having a circumferential opening communicating with the fluid passing through the joint, one of the free edges of the packing ring bearing on the spigot and extending from a side of the packing ring bearing on the inner side of the screwed packing gland member while the other free edge of the packing ring bears on a side of the recess in the socket member.

2. A spigot and socket joint comprising, a spigot, a socket member having a packing ring receiving recess of which the outer end is closed by an inwardly extending packing ring retaining member, a hollow fluid-sealed packing ring of flexible material having a circumferential opening communicating with the fluid passing through the joint, a split spigot-retaining ring, one of the free edges of the said packing ring bearing on the spigot and extending from a side of the packing ring bearing on the inwardly extending packing retaining member while the other free edge of the packing ring bears on a side of the recess in the socket member, the split spigot retaining ring being engaged on opposite sides by shoulders formed on the spigot and the inwardly extending packing ring retaining member.

3. A spigot and socket joint comprising, a spigot, a socket member having a packing ring receiving recess of which the outer end is closed by an externally screwed packing gland screwing into the outer end of the packing receiving recess, a hollow fluid-sealed packing ring of flexible material having a circumferential opening communicating with the fluid passing through the joint, a split spigot retaining ring, one of the free edges of the said packing ring bearing on the spigot and extending from a side of the packing ring bearing on the inner side of the screwed packing gland member while the other free edge of the packing ring bears on a side of the recess in the socket member, the split spigot retaining ring being engaged on opposite sides by shoulders formed on the spigot and the screwed packing gland.

4. A socket and spigot joint comprising a spigot, a socket member, a packing ring receiving recess located between said socket and spigot members, a packing ring in said recess open to internal pressure having a pair of inturned flexible lips bearing respectively upon said socket and spigot members to render the joint tight under pressure, said packing ring having an outer face inclined to one of said lips at an angle less than a right angle, a packing retaining member shaped internally to bear on said outer face whereby the pressure exerted upon the packing ring by said retaining member is in a direction tending to force said lip into engagement with its bearing surface.

5. A socket and spigot joint comprising a spigot, a socket member, a packing ring receiving recess located between said socket and spigot members, a packing ring in said recess open to internal pressure having a pair of inturned flexible lips bearing respectively upon said socket and spigot members to render the joint tight under pressure, said packing ring having an outer face inclined to one of said lips at an angle less than a right angle, an adjustable packing retaining member shaped internally to bear on said outer face whereby the initial pressure exerted mechanically upon the packing ring by said retaining member is in a direction tending to force said lip into engagement with its bearing surface.

6. A socket and spigot joint comprising a spigot, a socket member, a packing ring receiving recess located between said socket and spigot members, a packing ring in said recess open to internal pressure having a pair of inturned flexible lips bearing respectively upon said socket and spigot members to render the joint tight under pressure, said packing ring having an outer face inclined to one of said lips at an angle less than a right angle, an adjustable packing retaining member shaped internally to bear on said outer face whereby the initial pressure exerted mechanically upon the packing ring by said retaining member is in a direction tending to force said lip into engagement with its bearing surface.

In witness whereof we affix our signatures.

PERCY GRAHAM JOHNSON.
HAROLD RAYMOND MORGAN.